United States Patent
Yokoyama

(10) Patent No.: US 6,530,028 B1
(45) Date of Patent: Mar. 4, 2003

(54) IMAGE FORMING APPARATUS HAVING AN EFFICIENT LOCALIZATION SYSTEM, AND A METHOD THEREOF

(75) Inventor: Hiroshi Yokoyama, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/396,900

(22) Filed: Sep. 15, 1999

(30) Foreign Application Priority Data

Sep. 18, 1998 (JP) ............................. 10-264503

(51) Int. Cl.$^7$ ............... G06F 1/26; G06F 1/28
(52) U.S. Cl. ............... 713/330; 713/340; 704/8
(58) Field of Search .................. 713/330, 340; 358/1.14; 704/8

(56) References Cited

U.S. PATENT DOCUMENTS

| | | | | |
|---|---|---|---|---|
| 5,021,889 A | * | 6/1991 | Yamamoto | 358/440 |
| 5,493,868 A | * | 2/1996 | Kikuiri et al. | 62/129 |
| 5,541,389 A | * | 7/1996 | Kaneko | 219/505 |
| 5,712,977 A | * | 1/1998 | Glad et al. | 710/10 |
| 5,802,261 A | | 9/1998 | Yokoyama | |
| 6,041,183 A | * | 3/2000 | Hayafune et al. | 717/173 |
| 6,073,090 A | * | 6/2000 | Fortune et al. | 704/8 |
| 6,205,089 B1 | * | 2/2001 | Itoh | 368/10 |
| 6,343,263 B1 | * | 1/2002 | Nichols et al. | 702/189 |

FOREIGN PATENT DOCUMENTS

JP     7325494     12/1995

* cited by examiner

Primary Examiner—Thomas Lee
Assistant Examiner—James K. Trujillo
(74) Attorney, Agent, or Firm—Cooper & Dunham LLP

(57) ABSTRACT

An image forming apparatus which has an efficient localization system includes a heater, a first memory, a destination country setting mechanism, and a heater control selection mechanism. The first memory stores a first lookup table which contains information relating to a plurality of countries including information indicating a suitable heater control corresponding to a voltage of a commercial power source used in each of said plurality of countries. The destination country setting mechanism establishes a destination country. The heater control selection mechanism refers to the first lookup table stored in the first memory using the destination country established by the destination country setting mechanism to read a suitable heater control for the destination country, and controls a power supply to the heater based on the suitable heater control.

30 Claims, 13 Drawing Sheets

Fig. 4

REGION AND COUNTRY TABLE 3c

| REGION | COUNTRY |
|---|---|
| FRANCE | FRANCE |
| EUROPE | GERMANY, UNITED KINGDOM, ITALY, AUSTRIA, BELGIUM, DENMARK, FINLAND, IRELAND, NORWAY, SWEDEN, SWITZERLAND, PORTUGAL, NETERLAND, SPAIN, ISRAEL, SOUTH AFRICA, TURKEY, GREECE |
| NORTH AMERICA | CANADA, USA |
| ASIA | HONGKONG, AUSTRALIA, NEW ZEALAND, SINGAPORE, MALAYSIA |
| JAPAN | JAPAN |
| CHINA | CHINA |
| FORMOSA | FORMOSA |

Fig. 5

| REGION AND HEATER-CONTROL TABLE | | 3d |
|---|---|---|
| REGION | SELECTABLE HEATER CONTROL | |
| FRANCE | HEATER-CONTROL FOR 200-VOLT RANGE POWER | |
| EUROPE | HEATER-CONTROL FOR 200-VOLT RANGE POWER | |
| NORTH AMERICA | HEATER-CONTROL FOR 100-VOLT RANGE POWER | ... |
| ... | ... | |
| JAPAN | HEATER-CONTROL FOR 100-VOLT RANGE POWER | ... |
| ... | | |

Fig. 6

REGION AND LANGUAGE TABLE 3e

| REGION | SELECTABLE LANGUAGE |
|---|---|
| FRANCE | ENGLISH, FRENCH, ITALIAN, GERMAN, SPANISH, SWEDISH |
| EUROPE | ENGLISH, FRENCH, ITALIAN, GERMAN, SPANISH, SWEDISH |
| NORTH AMERICA | ENGLISH, FRENCH, SPANISH |
| ... | ... |
| JAPAN | JAPANESE, ENGLISH |
| ... | ... |

Fig. 7

| REGION AND TIME-SYSTEM TABLE | |
|---|---|
| REGION | SELECTABLE TIME SYSTEM |
| FRANCE | 12-HOUR TIME SYSTEM |
| EUROPE | 24-HOUR TIME SYSTEM |
| NORTH AMERICA | 12-HOUR TIME SYSTEM |
| ... | ... |
| JAPAN | 24-HOUR TIME SYSTEM |
| ... | ... |

```
                COUNTRY SETTING

NOW GERMANY IS SELECTED

PRESS  [↑]   FOR NEXT COUNTRY

PRESS  [↓]   FOR PREVIOUS COUNTRY

PRESS [YES]  FOR ACCEPTANCE
```

```
MEMORY TRANSMISSION
    15:12, NOVEMBER 11, 1998

SET DOCUMENT

MEMORY 100%
```

Fig. 16

```
MEMORY TRANSMISSION
    3:12 PM, NOVEMBER 11, 1998

SET DOCUMENT

MEMORY 100%
```

IMAGE FORMING APPARATUS HAVING AN EFFICIENT LOCALIZATION SYSTEM, AND A METHOD THEREOF

BACKGROUND

1. Field

The disclosed method and system generally relates to an image forming apparatus. More particularly, the disclosed method and system relates to an image forming apparatus which is capable of efficiently adapting the apparatus to local requirements such as power of a commercial power source, languages, and so forth.

2. Description of the Related Arts

In order to meet a variety of local requirements varied by destination country, localization has been a technical issue for various image forming apparatuses such as a copying machine, a facsimile machine, a printer, and so on. Many techniques have been introduced accordingly for an image forming apparatus which, in particular, employs a heater in a fixing mechanism thereof since the heater requires an application of a relatively large amount of power.

For example, Japanese Laid-Open Patent Publication No. JPAP07-325494 (1995) describes a facsimile machine which includes a heater and a power control for controlling power to the heater. This power control detects a voltage of a commercial power source, which may vary from a 100-volt range to a 200-volt range, and adjusts a voltage to be applied to the heater in accordance with the value of the voltage of the commercial power source. However, this technique requires an additional hardware element for the power control which brings a problem of increasing a manufacturing cost.

Another example of techniques for the localization which is more widely used is to provide a special ROM (read only memory) to the image forming apparatuses. This special ROM includes a heater control program in accordance with an amount of voltage of a commercial power source. Therefore, this technique requires to provide a number of ROMs each having a different heater control program according to the destination country. This makes the handling of ROMs complex. In addition, it cannot be flexible at an event, for example, when a destination of an apparatus is changed.

SUMMARY

The present invention provides an image forming apparatus which has an efficient localization system. In one embodiment, the image forming apparatus includes a heater, a first memory, destination country setting mechanism, and a heater control selection mechanism. The first memory stores a first lookup table which contains a plurality of countries each indicating a suitable heater control corresponding to a voltage of a commercial power source used therein. The destination country setting mechanism establishes a destination country. The heater control selection mechanism refers to the first lookup table stored in the first memory using the destination country established by the destination country setting mechanism to read a suitable heater control for the destination country, and controls a power supply to the heater based on the suitable heater control.

The suitable heater control contained in the first lookup table may be one of control procedures prepared for 100-volt and 200-volt commercial power sources.

The above-mentioned image forming apparatus may further includes a second memory a time-system selection mechanism. The second memory stores a second lookup table which contains a plurality of destination countries each indicating a preferred time system. The time-system selection mechanism refers to the second lookup table stored in the second memory using the destination country established by the destination country setting mechanism to read a preferred time system for the destination country, and controls time based on the preferred time system.

The preferred time system contained in the second lookup table may be one of control procedures prepared for 12-hour and 12-hour time systems.

The above-mentioned image forming apparatus may further includes a third memory and a language selection mechanism. The third memory stores a third lookup table which contains a plurality of destination countries each indicating at least one language. The language selection mechanism refers to the third lookup table stored in the third memory using the destination country established by the destination country setting mechanism to read a suitable language for the destination country, selects the suitable language, and performs a language control based on the selected language.

The present invention also provides a localization method of an image forming apparatus which has a heater. In one embodiment, the method includes the steps of storing, establishing, referring, and controlling. The storing step stores a first lookup table which contains a plurality of countries each indicating a suitable heater control corresponding to a voltage of a commercial power source used therein. The establishing step establishes a destination country. The referring step refers to the first lookup table using the destination country established in the establishing step to read a suitable heater control for the destination country. The controlling step controls a power supply to the heater based on the suitable heater control.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 illustrates an example of a region and country table as one of the lookup tables stored in the flash ROM of the facsimile apparatus of FIG. 1;

FIG. 5 illustrates an example of a region and heater-control table as one of the lookup tables stored in the flash ROM of the facsimile apparatus of FIG. 1;

FIG. 6 illustrates an example of a region and language table as one of the lookup tables stored in the flash ROM of the facsimile apparatus of FIG. 1;

FIG. 7 illustrates an example of a region and time-system table as one of the lookup tables stored in the flash ROM of the facsimile apparatus of FIG. 1;

FIG. 9 illustrates an example of a screen displayed during the destination country setting operation on the display panel unit of the facsimile apparatus of FIG. 1;

FIGS. 14–16 illustrate examples of a screen with applications of different languages and time systems of the localization system of the facsimile apparatus of FIG. 1.

DETAILED DESCRIPTION

Figure 1:
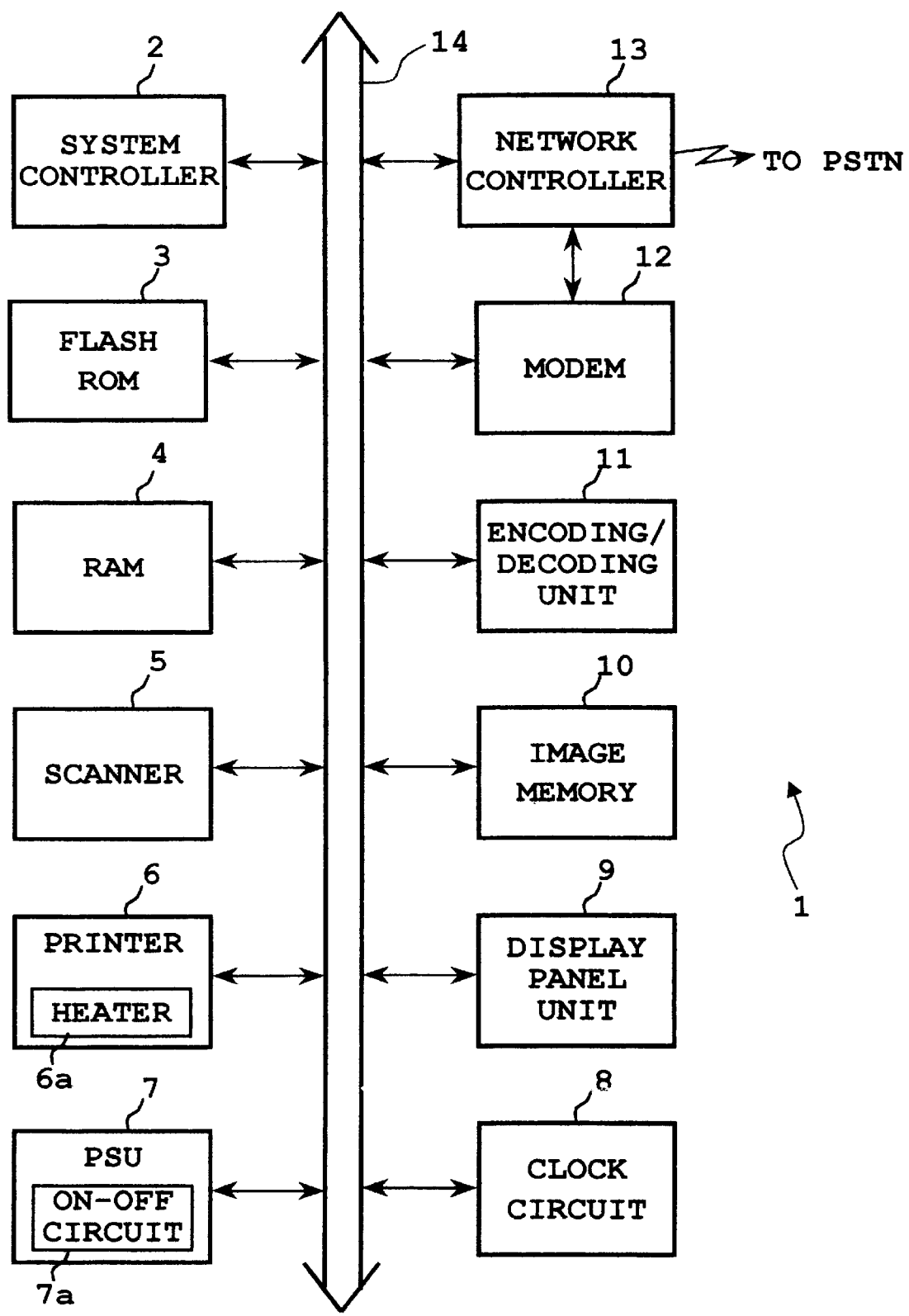
FIG. 1 is a block diagram of a facsimile apparatus according to an embodiment of the present invention.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates a block diagram of a facsimile apparatus 1 according to an embodiment of the present invention. The facsimile apparatus 1 of FIG. 1 includes a system controller 2, a flash ROM 3, a RAM 4, a scanner 5, a printer 6 including a heater 6a, a PSU (power supply unit) 7, a clock circuit 8, a display panel unit 9, an image memory 10, an encoding/decoding unit 11, a Modem 12, a network controller 13, and an internal bus 14.

Figure 2:
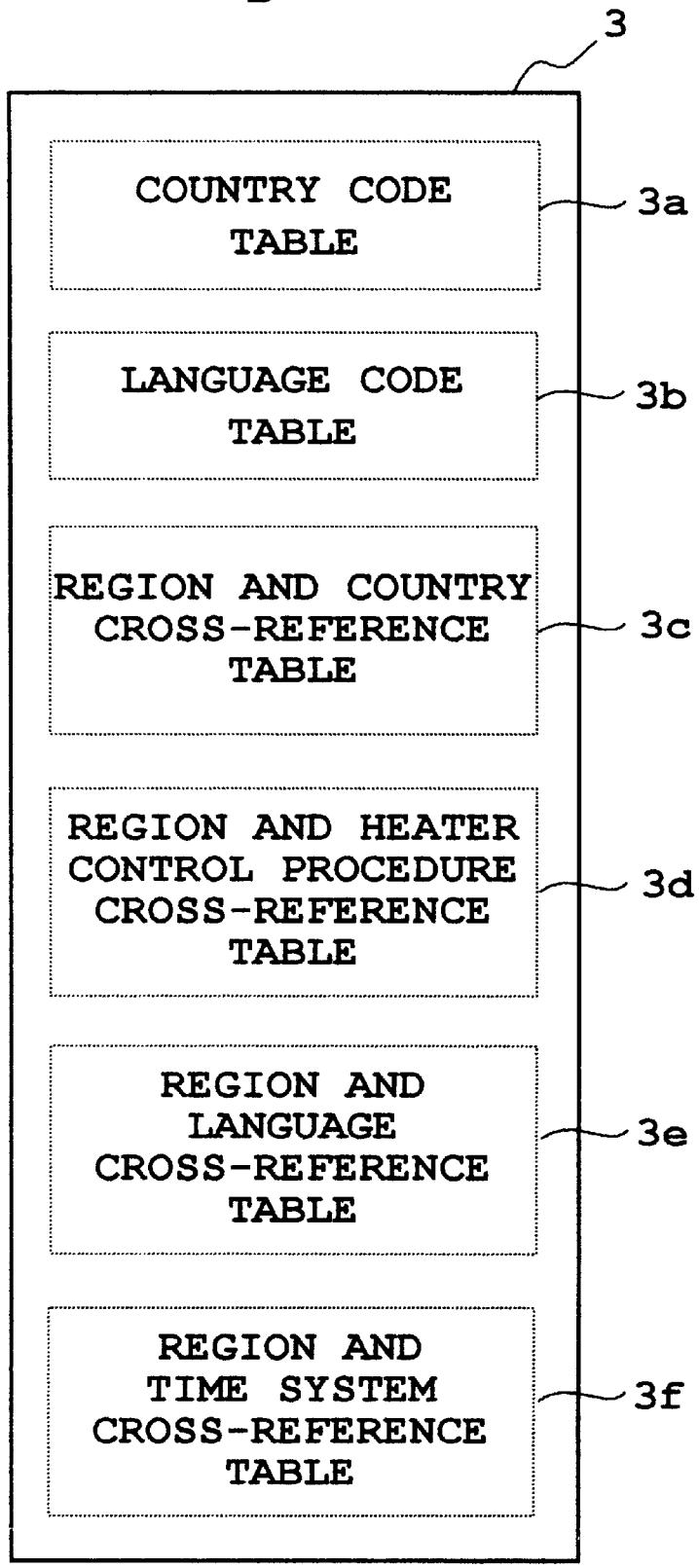
FIG. 2 illustrates a plurality of exemplary lookup tables stored in a flash ROM of the facsimile apparatus of FIG. 1.

The system controller 2 controls the operations of the facsimile apparatus 1, including facsimile data transmission controls for transmitting and receiving image information and arbitrary data files according to a predefined communications procedure (i.e., a Group-3 facsimile communications procedure). The flash ROM (read only memory) 3 includes an electrically reprogrammable read only memory and stores control (or application) programs to be executed by the system controller 2 and a plurality of lookup tables used when executing the control programs. The lookup tables in the flash ROM 3 includes, as shown in FIG. 2, a destination country table 3a, a language table 3b, a region and country table 3c, a region and heater-control table 3d, a region and language table 3e, and a region and time-system table 3f. The details of these lookup tables will be explained later.

The RAM (random access memory) 4 of FIG. 1 includes a working memory area reserved for use by the system controller 2. The scanner 5 reads an image of a document at one of predetermined image reading resolutions (i.e., 3.85 lines per mm, 7.7 lines per mm, 15.4 lines per mm, etc.). The printer 6 produces an image output at a predefined print resolution in accordance with the predetermined image reading resolution, based on image data obtained either through a facsimile receiving operation or a scanning operation with the scanner 5. The printer 6 performs its printing operation in accordance with an electrophotographic printing method and includes the heater 6a for fixing a toner image on a recording sheet after an image transfer operation in which such toner image is transferred from the photoconductive drum (not shown) to the recording sheet.

The PSU 7 is connected to a commercial power source (not shown) to obtain a source power, and includes a switching regulator (not shown) and an on-off circuit 7a. The PSU 7 converts the source voltage obtained from the commercial power source to predetermined stable voltages with the switching regulator and supplies these voltages to the driving elements in need of power other than the heater 6a in the facsimile apparatus 1. Since the driving elements other than the heater 6a require relatively small power, a general switching regulator can stable produce the regulated voltages based on the commercial power varying from a 100-volt range to a 200-volt range by country (i.e., 100 volts in Japan, 115 volts in U.S.A, 220 volts in many European countries). To the heater 6a which requires relatively great power, the PSU 7 sends the source voltage as it is through the on-off circuit 7a that allows the current to pass through only during the time when it is turned on. Alternatively, the PSU 7 may include a single switching regulator capable of generating predetermined stable voltages to be applied to all the driving elements including the heater 6a or two switching regulators, one for the heater 6a and the other for the driving elements other than the heater 6a, which alternative ways may increase the cost of manufacturing though.

The clock circuit 8 generates information of the present time. For example, the system controller 2 can realize the present time by reading the information of the clock circuit 8. The display panel unit 9 includes various kinds of operational keys and a display that interface between an operator and the facsimile apparatus 1, which will be explained later. The image memory 10 temporarily stores a file of image information read by the scanner 5 until the file is sent through a memory transmission operation for transmitting image information from a memory. Also, the image memory 10 temporarily stores a file of image information received from other facsimile terminal until the file is printed by the printer 6. The encoding/decoding unit 11 encodes image information to be transmitted to other facsimile terminals such that the information is compressed. Also, the encoding/decoding unit 11 decodes the compressed image information, which are transmitted from other facsimile terminals, back into original image information. For these compression and decompression operations, the encoding/decoding unit 11 uses various compression and decompression methods such as MH (modified Huffman), MR (modified READ), and MMR (modified modified READ) methods conformable to requirements of the Group 3 facsimile communications procedure.

The Modem 12 is preferably a Group 3 facsimile modem that performs the functions of a modem for the Group 3 facsimile machine. More specifically, the modem 12 modulates a data signal to be transmitted to other facsimile machines while it converts a modulated data signal received from other facsimile machines back into an unmodulated data signal. Also, the modem 12 produces a DTMF (dial tone multi-frequency) signal having a dial tone in response to a telephone number entered by an operator and sends the signal to other facsimile machines. In addition, the modem 12 has a feature of a low-speed modem such as a V.21 modem for transmitting and receiving communication protocols and a feature of a high-speed modem such as V.17, V.34, V.29, or V.27ter modems for mainly transmitting and receiving image information.

The network controller 13 is connected to an outside line such as a public switched telephone network (PSTN), and has a direct internal connection to the Modem 12. The network controller 13 includes an automatic transmitting and receiving function, and controls the connection of the facsimile apparatus 1 to various telephone networks such as the PSTN. More specifically, the functions of the network controller 13 includes connection and disconnection of a direct current loop on the line, detection of a reversed polarity on the line, line disconnection, and a busy tone, generation of dialing pulses, and so on.

The above-described units of the facsimile apparatus 1 can communicate with each other through the respective connections to the internal bus 14, as shown in FIG. 1.

Figure 3:
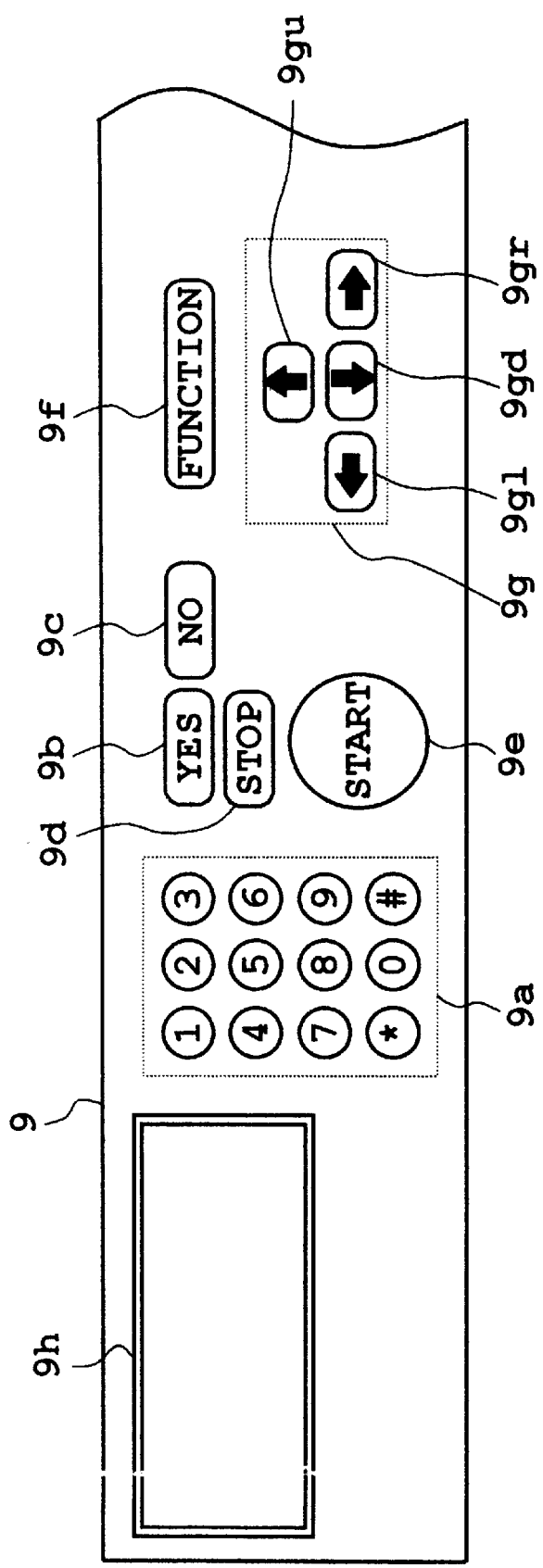
FIG. 3 illustrates an exemplary configuration of a display panel unit of the facsimile apparatus of FIG. 1.

Referring to FIG. 3, a configuration of the display panel unit 9 is explained. The display panel unit 9 includes various components such as a ten-key pad 9a, a YES key 9b, a NO key 9c, a STOP key 9d, a START key 9e, a FUNCTION key 9f, a cursor-key pad 9g including a LEFT key 9gl, a RIGHT 9gr, an UP key 9gu, and a DOWN key 9gd, and an LCD (liquid crystal display) 9h.

The ten-key pad 9a enters a numeric code representing, for example, a facsimile number of a destination facsimile machine. The YES and NO keys 9b and 9c respectively enter a user determination at each selection step throughout various operational procedures. The STOP key 9d enters an instruction for stopping an action. The START key 9e enters instructions for starting facsimile communications operations and a copying operation.

The FUNCTION key 9f calls up a variety of functions by entering a numeric code through the ten-key pad 9a after pressing the FUNCTION key 9f. Using the FUNCTION key 9f, the user can perform facsimile number registrations for a one-touch-dialing operation and for a short-dialing operation, and an entry of user parameters. Further, the user can perform non-standard enhanced functions such as a transmission operation to be performed at a designated time, a transmission operation which requires an entry of a sender code, a polling operation, and so forth.

The UP key 9gu and the DOWN key 9gd of the cursor-key pad 9g respectively change the position of the cursor shown in the LCD 9h or the contents of the LCD 9h, or scroll the contents of the LCD 9h up and down. The LEFT key 9gl and the RIGHT key 9gr of the cursor-key pad 9g respectively selects one of subjects or functions shown in the LCD 9h. The LCD 9h indicates various kinds of information such as information of operational statuses, a variety of messages to an operator, and so forth.

Referring now to FIG. 4, the details of the region and country table 3c is explained. In the region and country table 3c of FIG. 4, the column of region represents a region which may includes at least one country having the following three factors in common. The three factors are a voltage level of a commercial power source, the time-system, and a selectable language set.

The first factor, a voltage level of a commercial power source, relates to the heater 6a mounted on the printer 6 of the facsimile apparatus 1. As described above, the heater 6a is driven by the application of the non-regulated power through the PSU 7 from the commercial power source that may have a different voltage (i.e., 100, 115, or 220 volts) by country. In this case, the heater 6a may produce heat of different values by country since a heating value generally varies in proportion to a change of voltage. To avoid such a different heat production, it is normally required to control the power, for example, by changing the on-off time ratio in accordance with the voltage of the commercial power source of the country so as to regulate the generation of the heating value. For this control, the PSU 7 normally requires an additional circuit for detecting the voltage of the connected commercial power source, which may cause an increase of the manufacturing cost. However, this example avoids the needs of such an additional circuit by manually setting a suitable heater control (i.e., changing the on-off time ratio) in accordance with the voltage of the commercial power source of the country.

The second factor, the time-system, defines an expression of time. To express a specific time, this example provides two selectable expressions, 11:00 PM and 23:00, one of which can be selected as a user preference. The former expression is referred to as a 12-hour time system and the latter as a 24-hour time system. The third factor, the selectable language set, defines a selectable language set which includes at least one selectable language used in a specific region. For example, the region of North America including the destination countries of Canada and the U.S.A. has a selectable language set including English, French, and Spanish.

The column of country shown in the region and country table 3c of FIG. 4 represents a destination country. For example, a France corresponds to the destination country of France. Accordingly, the region and country table 3c defines that the region of France includes the destination country of France and that the region of Europe includes the destination countries of Germany, the United Kingdom, Austria, Belgium, Denmark, Finland, Ireland, Norway, Sweden, Switzerland, Portugal, the Netherlands, Spain, Israel, South Africa, Turkey, and Greece. Further, the region and country table 3c defines that the region of North America includes Canada and the U.S.A., that the region of Asia includes Hong Kong, Australia, New Zealand, Singapore, and Malaysia. Further, the region and country table 3c defines that the region of Japan includes Japan, that the region of China includes China, and that the region of Formosa includes Formosa.

The region and heater-control table 3d shown in FIG. 5 defines the relationship of each region and a suitable heater-control corresponding thereto. For example, the region of France requires the heater control for the commercial power source having power of a 200-volt range, and the regions of Europe, North America, and Japan require the heater control for the commercial power source having power of a 100-volt range. The region and language table 3e shown in FIG. 6 defines the relationship between the region and a selective language set. For example, the region of France which includes the destination country of France, as shown in the region and country table 3c of FIG. 4, requires the selective languages of English, French, Italian, German, Spanish, and Swedish, as shown in the region and language table 3e of FIG. 6. The region and time-system table 3f shown in FIG. 7 defines the relationship between the region and the time system. For example, the regions of France, Europe, and Japan require the 24-hour time system but the region of North America requires the 12-hour time system, as shown in the region and time-system table 3f of FIG. 7.

The facsimile apparatus 1 is configured in such a way as described above and is thus provided with an efficient localization system in which destination countries are divided into a plurality of regions based on commonality of the above-described three factors. By thus providing the region and country table, the total memory size of the lookup tables in the flash ROM 3 can be made relatively small. In addition, registration of a destination country can be completed by adding it to the region and country table 3c without requiring changes of the region and heater-control table 3d, the region and language table 3e, and the region and time-system table 3f.

Next, an exemplary procedure of a destination country setting operation in the localization system of the facsimile apparatus 1 will be explained with reference to FIG. 8. The procedure of the destination country setting operation of FIG. 8 can be performed anywhere and anytime. For example, it can be performed at a manufacturing plant before shipping the machine, or at a user place after the delivery of the machine.

Figure 8:
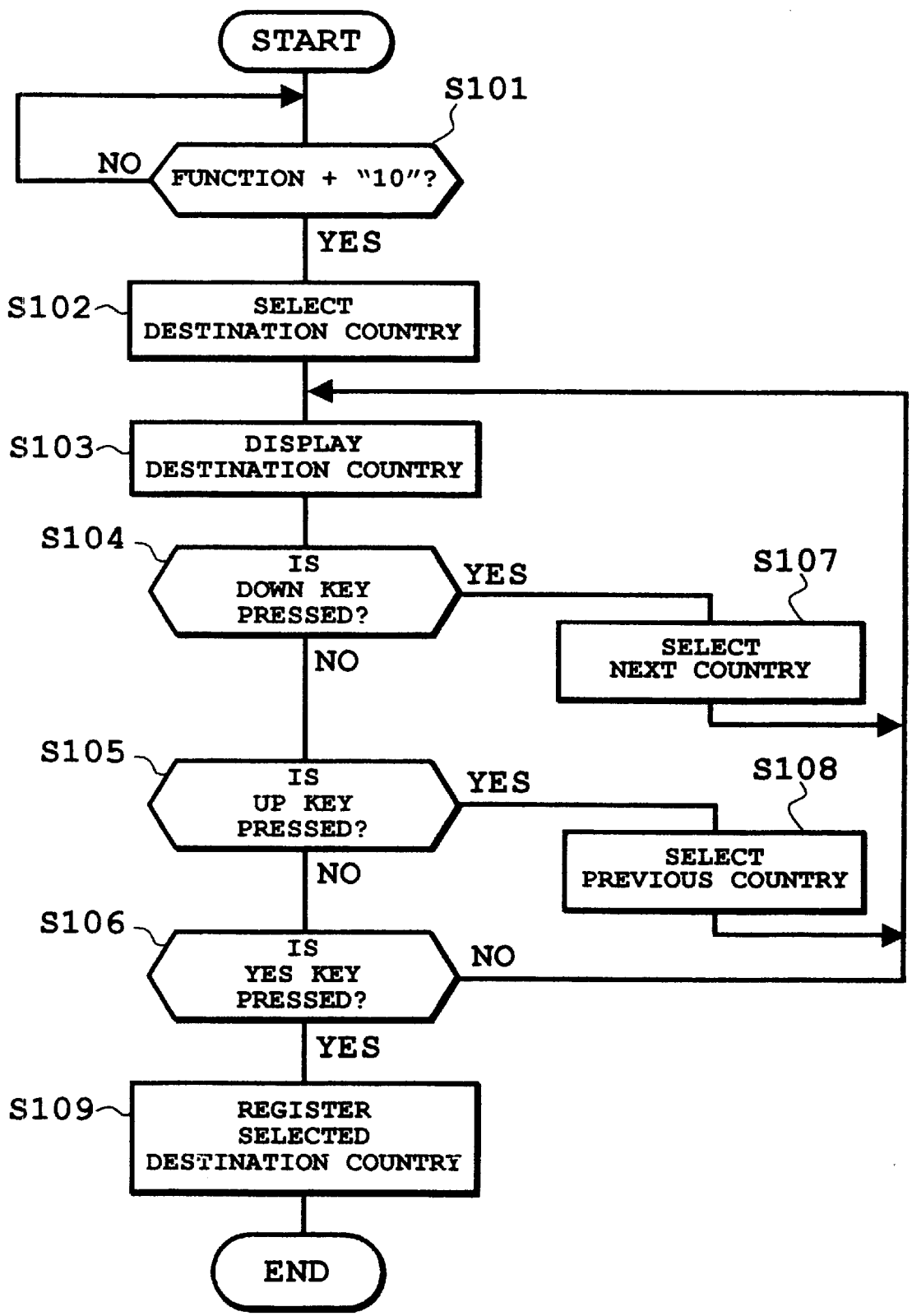
FIG. 8 explains an exemplary destination country setting operation in a localization system of the facsimile apparatus of FIG. 1.

In FIG. 8, the system controller 2 continuously watches through a NO loop of Step S101 as to whether the FUNCTION key 9f on the display panel unit 9 is pressed and a numerical code 10 is entered through the ten-key pad 9a, wherein the combination of a press of the FUNCTION key 9f and an input of a numeric code 10 through the ten-key pad 9a is predefined as an instruction for starting a destination country setting operation. If the above combination is detected and the result of Step S101 is YES, it means that the destination country setting operation is started and the process then goes to Step S102.

In Step S102, the system controller 2 selects one country from among the destination countries registered in the region and country table 3c. Subsequently, in Step S103, the system controller 2 instructs the display panel unit 9 to display the selected country on the LCD 9h. An exemplary screen D1 to be displayed on the LCD 9h in Step S103 is shown in FIG. 9, which indicates the presently selected country GERMANY, as an example. The screen D1 also indicates instructions for selecting next and previous countries by pressing the DOWN key 9gd and the UP key 9gu, respectively, and for accepting the country displayed on the LCD 9h by pressing the YES key 9b.

Then, the system controller 2 watches whether the UP key 9gu, the DOWN key 9gd, or the YES key 9b is pressed, through successive Steps S104, S105, and S106. More specifically, the system controller 2 checks in Step S104 if the DOWN key 9gd is pressed. If the press of the DOWN key 9gd is detected and the result of Step S104 is YES, the process goes to Step S107 in which the system controller 2 selects the next country. After that, the process goes back to Step S103 so that the next country is displayed in the screen D1 on the LCD 9h.

If the press of the DOWN key 9gd is not detected and the result of Step S104 is NO, the process goes to Step S105 in which the system controller 2 checks if the UP key 9gu is pressed. If the press of the UP key 9gu is detected and the result of Step S105 is YES, the process goes to Step S108 in which the system controller 2 selects the previous country. Then, the process goes back to Step S103 so that the previous country is displayed in the screen D1 on the LCD 9h.

If the press of the UP key 9gu is not detected and the result of Step S105 is NO, the process goes to Step S106 in which the system controller 2 checks if the YES key 9b is pressed If the press of the YES key 9b is not detected and the result of Step S106 is NO, the process goes back to Step S103 so that the processes of Steps S104, S105, and S106 are repeated. If the press of the YES key 9b is detected and the result of Step S106 is YES, the process goes to Step S109. Then, in Step S109, the system controller 2 registers the country presently selected through Steps S102, S107, and S108 in the destination country table 3a.

Next, an exemplary procedure of a language setting operation in the localization system of the facsimile apparatus 1 is explained with reference to FIG. 10. The procedure of the language setting operation of FIG. 10 can be performed anywhere and anytime, as the destination country setting operation is so. For example, it can be performed at a manufacturing plant before shipping the machine, or at a user place after the delivery of the machine.

Figure 10:
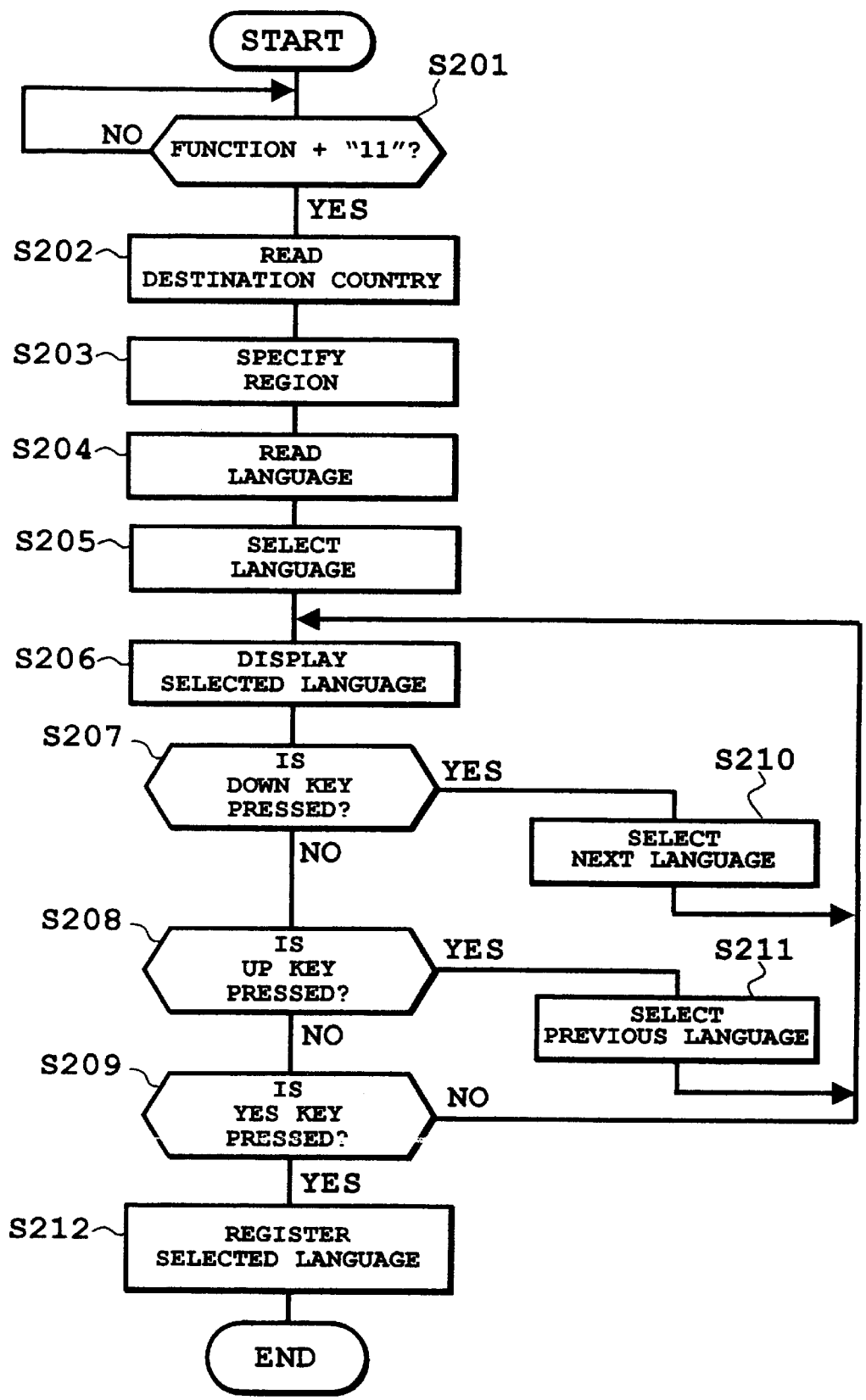
FIG. 10 explains an exemplary language setting operation in a localization system of the facsimile apparatus of FIG. 1.

In FIG. 10, the system controller 2 continuously watches through a NO loop of Step S201 as to whether the FUNCTION key 9f on the display panel unit 9 is pressed and a numerical code 11 is entered through the ten-key pad 9a, wherein the combination of a press of the FUNCTION key 9f and an input of a numeric code 11 through the ten-key pad 9a is predefined as an instruction for starting a language setting operation. If the above combination is detected and the result of Step S201 is YES, it means that the language setting operation is started and the process then goes to Step S202.

In Step S202, the system controller 2 reads the destination country in the destination country table 3a of the flash ROM 3. Then, the system controller 2 specifies the region corresponding to the destination country, in Step S203, by referring to the region and country table 3c, and refers to the region and language table 3e so as to read the selective language set for the specified region, in Step S204.

Figure 11:
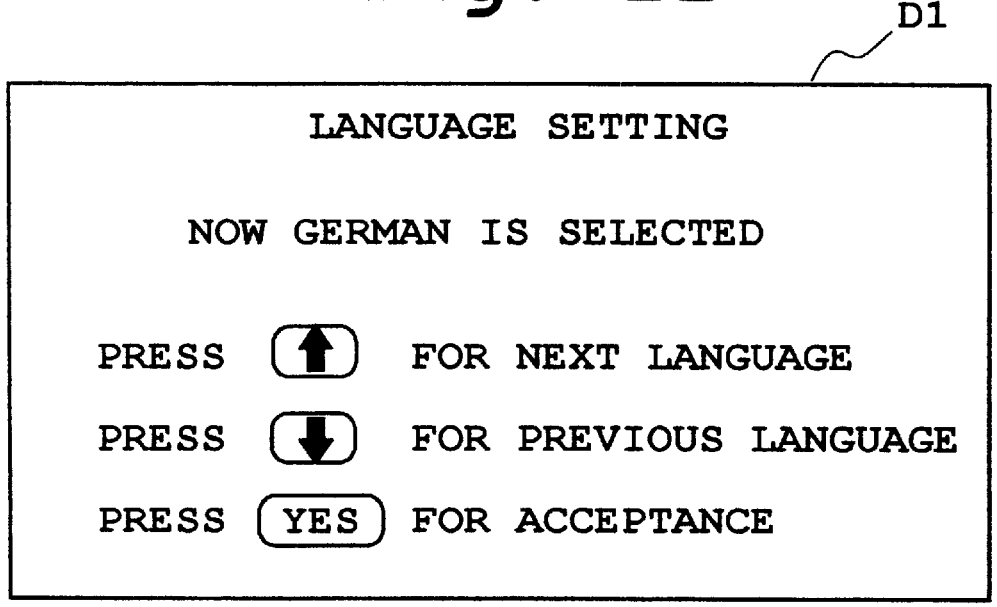
FIG. 11 illustrates an example of a screen displayed during the language setting operation on the display panel unit of the facsimile apparatus of FIG. 1.

In Step S205, the system controller 2 selects one language from among the languages included in the selective language set registered in the region and language table 3e. Subsequently, in Step S206, the system controller 2 instructs the display panel unit 9 to display the selected language on the LCD 9h. An exemplary screen D2 to be displayed on the LCD 9h in Step S206 is shown in FIG. 11, which indicates the presently selected country GERMAN, as an example. The screen D2 also indicates instructions for selecting next and previous countries by pressing the DOWN key 9gd and the UP key 9gu, respectively, and for accepting the language displayed on the LCD 9h by pressing the YES key 9b.

Then, the system controller 2 watches whether the UP key 9gu, the DOWN key 9gd, or the YES key 9b is pressed, through successive Steps S207, S208, and S209. More specifically, the system controller 2 checks in Step S207 if the DOWN key 9gd is pressed. If the press of the DOWN key 9gd is detected and the result of Step S207 is YES, the process goes to Step S210 in which the system controller 2 selects the next language. After that, the process goes back to Step S206 so that the next country is displayed in the screen D1 on the LCD 9h.

If the press of the DOWN key 9gd is not detected and the result of Step S207 is NO, the process goes to Step S208 in which the system controller 2 checks if the UP key 9gu is pressed. If the press of the UP key 9gu is detected and the result of Step S208 is YES, the process goes to Step S211 in which the system controller 2 selects the previous language. Then, the process goes back to Step S206 so that the previous language is displayed in the screen D2 on the LCD 9h.

If the press of the UP key 9gu is not detected and the result of Step S208 is NO, the process goes to Step S209 in which the system controller 2 checks if the YES key 9b is pressed. If the press of the YES key 9b is not detected and the result of Step S209 is NO, the process goes back to Step S206 so that the processes of Steps S207, S208, and S209 are repeated. If the press of the YES key 9b is detected and the result of Step S209 is YES, the process goes to Step S212. Then, in Step S212, the system controller 2 registers the language presently selected through Steps S205, S210, and S211 in the language table 3b.

Figure 12:
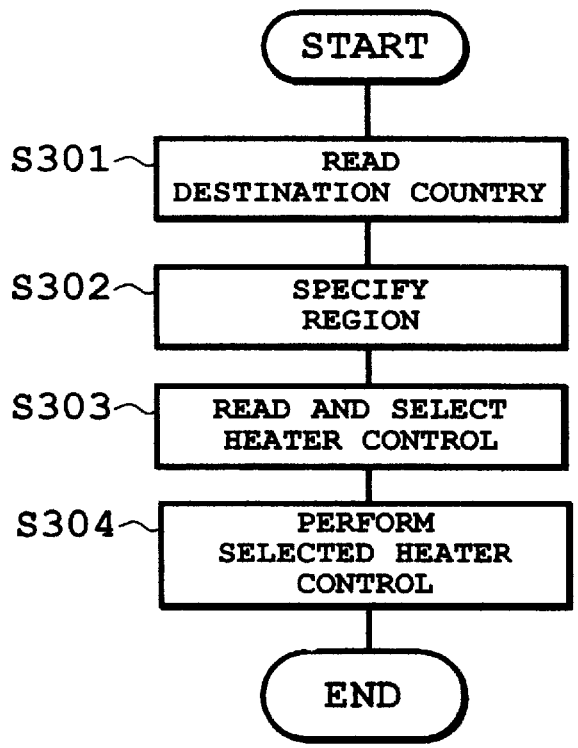
FIG. 12 explains an exemplary automatic heater control setting operation in a localization system of the facsimile apparatus of FIG. 1.

Next, an exemplary procedure of an automatic heater control selection operation in the localization system of the facsimile apparatus 1 is explained with reference to FIG. 12. This example is provided with selectable heater controls for power of 100-volt and 200-volt ranges, for example, which are prestored in the flash ROM 3, for example. The below explained automatic heater control selection operation will be performed upon the facsimile apparatus 1 is turned on.

In Step S301, the system controller 2 reads the destination country in the destination country table 3a of the flash ROM 3. The system controller 2 then specifies the region corresponding to the destination country, in Step S302, by referring to the region and country table 3c. After that, in Step S303, the system controller 2 reads the suitable heater control (i.e., for the 100-volt or 200-volt range power) for the specified region by referring to the region and heater-control table 3d and accordingly selects the read suitable heater control.

In this example, selection of a suitable heater control causes two parameter tables switched from one the other, each of which parameter tables has heater control parameters suitable for a specific power range (i.e., the 100-volt or 200-volt range). In Step S304, the system controller 2 instructs the PSU 7 to use the selected heater control in controlling the on-off circuit 7a.

Figure 13:
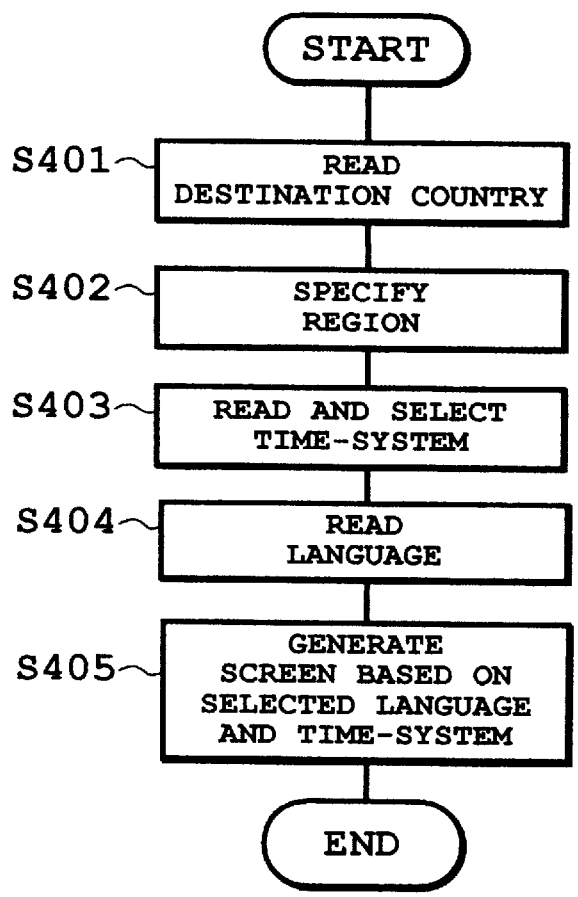
FIG. 13 explains an exemplary automatic display control setting operation in a localization system of the facsimile apparatus of FIG. 1.

Next, an exemplary procedure of an automatic display control selection operation in the localization system of the facsimile apparatus 1 is explained with reference to FIG. 13. This automatic display control selection operation will be performed upon the facsimile apparatus 1 is turned on. In Step S401, the system controller 2 reads the destination country in the destination country table 3a of the flash ROM 3. The system controller 2 then specifies the region corresponding to the destination country, in Step S402, by referring to the region and country table 3c. In Step S403, the system controller 2 reads the time-system (i.e., the 12-hour or 24-hour time system) for the specified region by referring to the region and time-system table 3f and accordingly selects the read time system. In Step S404, the system controller 2 reads the language in the language table 3b. Then, in Step S405, the system controller 2 instructs the display panel unit 9 to use the time system selected in Step S403 and the language read in Step S404 in controlling the LCD 9h.

Figure 14:
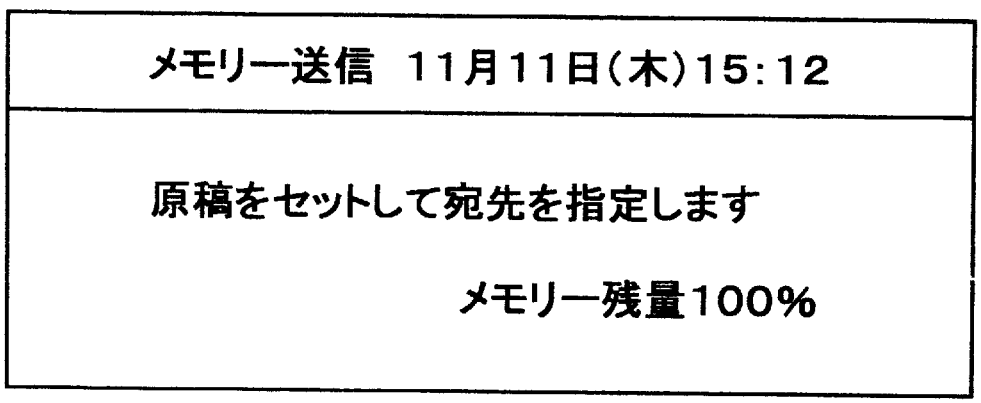

Referring to FIGS. 14–16, examples of screens displayed on the LCD 9h in Step S405 are explained. The screen of FIG. 14 indicates descriptions in Japanese and time (i.e., 15:12) read from the clock circuit 8 using the 24-hour time system. This type of screen is generated when Japan is set at the destination country table 3a and Japanese is set at the language table 3b since the region of Japan is set to the 24-hour time system.

The screen of FIG. 15 uses the English language and the 24-hour time system (i.e., 15:12). This type of screen is generated in many cases, for example, when Japan is set at the destination country table 3a and English is set at the language table 3b since the region of Japan is set to the 24-hour time system. The screen of FIG. 16 uses the English language and the 12-hour time system (i.e., 3:12 PM). This type of screen is generated in many cases, for example, when U.S.A is set at the destination country table 3a and English is set at the language table 3b since the region of North America is set to the 12-hour time system.

Numerous additional modifications and variations of the present application are possible in light of the above teachings. It is therefore to be understood that within the scope of the appended claims, the present application may be practiced otherwise than as specifically described herein.

This document claims priority rights of and is based on the subject matter described in Japanese Patent Application No. JPAP10-264503 filed on Sep. 18, 1998, the entire contents of which are herein incorporated by reference.

I claim:

1. An image forming apparatus, comprising:
   a heater;
   a first memory for storing a first lookup table which contains information relating to a plurality of countries including information indicating a suitable heater control corresponding to a voltage of a commercial power source used in each of said plurality of countries;
   a destination country setting mechanism for establishing a destination country;
   a heater control selection mechanism for referring to said first lookup table stored in said first memory using said destination country established by said destination country setting mechanism to read a suitable heater control for said destination country, and for controlling a power supply to said heater based on said suitable heater control.

2. An image forming apparatus as defined in claim 1, wherein said suitable heater control contained in said first lookup table is one of control procedures prepared for 100-volt and 200-volt commercial power sources.

3. An image forming apparatus as defined in claim 1, further comprising:
   a second memory for storing a second lookup table which contains information relating to a plurality of destination countries including information indicating a preferred time system in each of said plurality of countries;
   a time-system selection mechanism for referring to said second lookup table stored in said second memory using said destination country established by said destination country setting mechanism to read a preferred time system for said destination country, and for controlling time based on said preferred time system.

4. An image forming apparatus as defined in claim 3, wherein said preferred time system contained in said second lookup table is one of control procedures prepared for 12-hour and 24 hour time systems.

5. An image forming apparatus as defined in claim 1, further comprising:
   a third memory for storing a third lookup table which contains information relating to a plurality of destination countries including information indicating at least one language in each of said plurality of countries;
   a language selection mechanism for referring to said third lookup table stored in said third memory using said destination country established by said destination country setting mechanism to read a suitable language for said destination country, for selecting said suitable language, and for performing a language control based on said selected language.

6. An image forming apparatus, comprising:
   heater means;
   first memory means for storing a first lookup table which contains information relating to a plurality of countries including information indicating a suitable heater control corresponding to a voltage of a commercial power source used in each of said plurality of countries;
   destination country setting means for establishing a destination country;
   heater control selection means for referring to said first lookup table stored in said first memory means using said destination country established by said destination country setting means to read a suitable heater control for said destination country, and for controlling a power supply to said heater means based on said suitable heater control.

7. An image forming apparatus as defined in claim 6, wherein said suitable heater control contained in said first lookup table is one of control procedures prepared for 100-volt and 200-volt commercial power sources.

8. An image forming apparatus as defined in claim 6, further comprising:

second memory means for storing a second lookup table which contains information relating to a plurality of destination countries including information indicating a preferred time system in each of said plurality of countries;

time-system selection means for referring to said second lookup table stored in said second memory means using said destination country established by said destination country setting means to read a preferred time system for said destination country, and for controlling time based on said preferred time system.

9. An image forming apparatus as defined in claim 8, wherein said preferred time system contained in said second lookup table is one of control procedures prepared for 12-hour and 24 hour time systems.

10. An image forming apparatus as defined in claim 6, further comprising:

third memory means for storing a third lookup table which contains information relating to a plurality of destination countries including information indicating at least one language in each of said plurality of countries;

language selection means for referring to said third lookup table stored in said third memory means using said destination country established by said destination country setting means to read a suitable language for said destination country, for selecting said suitable language, and for performing a language control based on said selected language.

11. A localization method of an image forming apparatus having a heater, comprising the steps of:

storing a first lookup table which contains information relating to a plurality of countries including information indicating a suitable heater control corresponding to a voltage of a commercial power source used in each of said plurality of countries;

establishing a destination country;

referring to said first lookup table using said destination country established in said establishing step to read a suitable heater control for said destination country; and controlling a power supply to said heater based on said suitable heater control.

12. A localization method as defined in claim 11, wherein said suitable heater control contained in said first lookup table is one of control procedures prepared for 100-volt and 200-volt commercial power sources.

13. A localization method as defined in claim 11, further comprising the steps of:

storing a second lookup table which contains information relating to a plurality of destination countries including information indicating a preferred time system in each of said plurality of countries;

referring to said second lookup table using said destination country established by said establishing step to read a preferred time system for said destination country; and controlling time based on said preferred time system.

14. A localization method as defined in claim 13, wherein said preferred time system contained in said second lookup table is one of control procedures prepared for 12-hour and 24 hour time systems.

15. A localization method as defined in claim 11, further comprising the steps of:

storing a third lookup table which contains information relating to a plurality of destination countries including information indicating at least one language in each of said plurality of countries;

referring to said third lookup table using said destination country established by said establishing step to read a suitable language for said destination country;

selecting said suitable language; and performing a language control based on said selected language.

16. A facsimile apparatus, comprising:

a heater;

a first memory for storing a first lookup table which contains information relating to a plurality of countries including information indicating a suitable heater control corresponding to a voltage of a commercial power source used in each of said plurality of countries;

a destination country setting mechanism for establishing a destination country;

a heater control selection mechanism for referring to said first lookup table stored in said first memory using said destination country established by said destination country setting mechanism to read a suitable heater control for said destination country, and for controlling a power supply to said heater based on said suitable heater control.

17. A facsimile apparatus as defined in claim 16, wherein said suitable heater control contained in said first lookup table is one of control procedures prepared for 100-volt and 200-volt commercial power sources.

18. A facsimile apparatus as defined in claim 16, further comprising:

a second memory for storing a second lookup table which contains information relating to a plurality of destination countries including information indicating a preferred time system in each of said plurality of countries;

a time-system selection mechanism for referring to said second lookup table stored in said second memory using said destination country established by said destination country setting mechanism to read a preferred time system for said destination country, and for controlling time based on said preferred time system.

19. A facsimile apparatus as defined in claim 18, wherein said preferred time system contained in said second lookup table is one of control procedures prepared for 12-hour and 24 hour time systems.

20. A facsimile apparatus as defined in claim 16, further comprising:

a third memory for storing a third lookup table which contains information relating to a plurality of destination countries including information indicating at least one language in each of said plurality of countries;

a language selection mechanism for referring to said third lookup table stored in said third memory using said destination country established by said destination country setting mechanism to read a suitable language for said destination country, for selecting said suitable language, and for performing a language control based on said selected language.

21. A facsimile apparatus, comprising:

heater means;

first memory means for storing a first lookup table which contains information relating to a plurality of countries including information indicating a suitable heater control corresponding to a voltage of a commercial power source used in each of said plurality of countries;

destination country setting means for establishing a destination country;

heater control selection means for referring to said first lookup table stored in said first memory means using said destination country established by said destination country setting means to read a suitable heater control for said destination country, and for controlling a power supply to said heater means based on said suitable heater control.

22. A facsimile apparatus as defined in claim 21, wherein said suitable heater control contained in said first lookup table is one of control procedures prepared for 100-volt and 200-volt commercial power sources.

23. A facsimile apparatus as defined in claim 21, further comprising:

second memory means for storing a second lookup table which contains information relating to a plurality of destination countries including information indicating a preferred time system in each of said plurality of countries;

time-system selection means for referring to said second lookup table stored in said second memory means using said destination country established by said destination country setting means to read a preferred time system for said destination country, and for controlling time based on said preferred time system.

24. A facsimile apparatus as defined in claim 23, wherein said preferred time system contained in said second lookup table is one of control procedures prepared for 12-hour and 24 hour time systems.

25. A facsimile apparatus as defined in claim 21, further comprising:

third memory means for storing a third lookup table which contains information relating to a plurality of destination countries including information indicating at least one language in each of said plurality of countries;

language selection means for referring to said third lookup table stored in said third memory means using said destination country established by said destination country setting means to read a suitable language for said destination country, for selecting said suitable language, and for performing a language control based on said selected language.

26. A localization method of a facsimile apparatus having a heater, comprising the steps of:

storing a first lookup table which contains information relating to a plurality of countries including information indicating a suitable heater control corresponding to a voltage of a commercial power source used in each of said plurality of countries;

establishing a destination country;

referring to said first lookup table using said destination country established in said establishing step to read a suitable heater control for said destination country; and controlling a power supply to said heater based on said suitable heater control.

27. A localization method as defined in claim 26, wherein said suitable heater control contained in said first lookup table is one of control procedures prepared for 100-volt and 200-volt commercial power sources.

28. A localization method as defined in claim 26, further comprising the steps of:

storing a second lookup table which contains information relating to a plurality of destination countries including information indicating a preferred time system in each of said plurality of countries;

referring to said second lookup table using said destination country established by said establishing step to read a preferred time system for said destination country; and controlling time based on said preferred time system.

29. A localization method as defined in claim 28, wherein said preferred time system contained in said second lookup table is one of control procedures prepared for 12-hour and 24 hour time systems.

30. A localization method as defined in claim 26, further comprising the steps of:

storing a third lookup table which contains information relating to a plurality of destination countries including information indicating at least one language in each of said plurality of countries;

referring to said third lookup table using said destination country established by said establishing step to read a suitable language for said destination country;

selecting said suitable language; and performing a language control based on said selected language.

* * * * *